US007919176B2

(12) United States Patent
Wickramanayake

(10) Patent No.: US 7,919,176 B2
(45) Date of Patent: Apr. 5, 2011

(54) INK-JET MEDIA POROUS COATINGS WITH CHEMICALLY ATTACHED ACTIVE LIGANDS

(75) Inventor: Palitha Wickramanayake, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1327 days.

(21) Appl. No.: 10/120,470

(22) Filed: Apr. 10, 2002

(65) Prior Publication Data

US 2003/0198801 A1 Oct. 23, 2003

(51) Int. Cl.

| | |
|---|---|
| ***B32B 3/26*** | (2006.01) |
| ***B32B 3/10*** | (2006.01) |
| ***B32B 5/16*** | (2006.01) |
| ***B32B 27/36*** | (2006.01) |
| ***C09J 7/02*** | (2006.01) |
| ***C08J 7/04*** | (2006.01) |
| ***G03G 5/10*** | (2006.01) |

(52) U.S. Cl. ....... 428/304.4; 428/46; 428/412; 428/331; 428/323; 428/337; 428/341; 428/342

(58) Field of Classification Search .................... 428/46, 428/412, 304.4, 331, 323, 337, 341, 342, 428/32.1–32.8; 55/18

See application file for complete search history.

(56) References Cited

U.S. PATENT DOCUMENTS

| | | | | |
|---|---|---|---|---|
| 3,886,080 | A * | 5/1975 | Schucker et al. | 252/176 |
| 4,714,769 | A * | 12/1987 | De Antoniis et al. | 556/419 |
| 4,877,451 | A * | 10/1989 | Winnik et al. | 106/31.45 |
| 5,224,972 | A * | 7/1993 | Frye et al. | 95/9 |
| 5,804,293 | A | 9/1998 | Nehmsmann et al. | |
| 5,985,425 | A | 11/1999 | Tomizawa et al. | |
| 6,126,280 | A * | 10/2000 | Hashimoto et al. | 347/101 |
| 2002/0032269 | A1 | 3/2002 | Schobe et al. | |

FOREIGN PATENT DOCUMENTS

| | | | |
|---|---|---|---|
| EP | 0 827 842 | | 3/1998 |
| EP | 1352757 | * | 10/2003 |
| JP | 60224580 A | * | 11/1985 |
| JP | 62286787 | | 12/1987 |
| JP | 08337049 A | * | 12/1996 |
| WO | WO 97/20216 | * | 6/1997 |

OTHER PUBLICATIONS

Derwent abstract of JP 60224580, see above for date and inventor.*
Machine translation of JP 08-337049, see above for inventor and date.*
English translation of JP 60-224580 A, see P10-892 mailed Sep. 23, 2005 for date and inventor.*

* cited by examiner

*Primary Examiner* — Victor S Chang

(57) ABSTRACT

The present invention is drawn to a coated substrate for ink-jet ink printing comprising a substrate, having coated thereon, a porous coating, wherein the porous coating comprises silica covalently attached to a chelating agent, an ultraviolet blocker, and/or a hindered amine light stabilizer. In one embodiment, the chelating agent, ultraviolet blocker, and/or hindered amine light stabilizer can be substantially homogenously distributed on the silica.

17 Claims, No Drawings

INK-JET MEDIA POROUS COATINGS WITH CHEMICALLY ATTACHED ACTIVE LIGANDS

FIELD OF THE INVENTION

The present invention is drawn to silica coatings for ink-jet media having chemically attached ultraviolet blockers, metal chelating agents, and/or hindered amine light stabilizers.

BACKGROUND OF THE INVENTION

In recent years, computer printer technology has evolved to a point where high resolution images can be transferred on to various types of media, including paper. One particular type of printing involves the placement of small drops of a fluid ink onto media surfaces in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit or drop-on-demand ink deposit.

With regard to continuous printing systems, inks used are typically based on solvents such as methyl ethyl ketone and ethanol. Essentially, continuous printing systems function as a stream of ink droplets that are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and glycols. Essentially, with these systems, ink droplets are propelled from a nozzle by heat or by a pressure wave such that all of the ink droplets ejected are used to form the printed image.

There are several reasons that make ink-jet printing a popular way of recording images on various media surfaces, particularly paper. Some of these reasons include low printer noise, capability of high-speed recording, and multi-color recording. Additionally, these advantages can be obtained at a relatively low cost to consumers. However, though there have been great improvements in ink-jet printing, accompanying these improvements are increased consumer demands such as higher speeds, higher resolution, full color image formation, increased image durability, etc. As new ink-jet inks are developed, there have been several traditional characteristics to consider when evaluating the ink in conjunction with printing media. Such characteristics include edge acuity and optical density of the image on the surface, dry time of the ink on the substrate, adhesion to the substrate, lack of deviation of ink droplets, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component to address one of the above attributes prevents another being met. Thus, most commercial inks for use in ink-jet printers represent a compromise, in an attempt to achieve adequate performance in all of the above listed attributes.

Ink-jet inks are either dye- or pigment-based. Dye-based ink-jet inks generally use water-soluble colorants. As a result, such dye-based inks are usually not water fast. Prints made from these inks tend to undergo color change over time, or fading, when exposed to ambient light and air. The media surface plays a key role in the fade properties and wet fastness of an image in that for a given ink, the degree of fade and wet fastness is highly dependent on the chemistry of the media surface. Therefore, for optimum performance, many ink-jet inks often require that an appropriate media be selected in accordance with the application, thus, reducing the choice of media. In the case of pigmented inks, it is the dispersed colorant particles that produce color. Often the line quality of prints produced by pigment-based inks is superior to that of dye-based inks. When a printed image is made with pigmented inks, solid colorant particles adhere to the surface of the substrate. Once the ink vehicle evaporates, the particles will generally not go back into solution, and are therefore more water fast. In addition, pigmented inks are much more fade resistant than dye-based inks. Though pigmented inks, in some areas, exhibit superior performance, dyes in general produce inherently more color saturated and more reliable inks. Thus, dye-based inks have been more often used in applications where fade resistance is not essential.

In order for ink-jet industry to effectively compete with silver halide photography, it is important that ink-jet prints must improve their image fade resistance. In other words, enhanced permanence of images has become important to the long-term success of photo-quality ink-jet ink technologies. At this point in time, for instance, according to accelerated tests and "industry standard" failure criteria, photographs typically will last about 13 to 22 years under fluorescent light exposure. The best dye based ink-jet printers produce prints that last for much less time under similar conditions.

Two broad categories of photographic ink-jet media are currently available: polymer and porous coating based media. It is the polymer based type that produce the best known images, i.e. longest lasting, mentioned above. However, this category is much inferior in dry time and wet fastness relative to porous coating-based media. On the other hand, image fade resistance of the porous coating-based media is significantly worse than that of polymer-based counterparts. Therefore, there is a great desire to enhance the image fade resistance and humid fastness of ink jet ink images on porous coating based media.

SUMMARY OF THE INVENTION

In accordance with the compositions and coated substrates of the present invention, the use of a chemically modified silica coating can provide certain advantages related to image permanence over the prior art. For example, the use of an ultraviolet blocker, a metal chelating agent, and/or a hindered amine light stabilizer, chemically attached to silica for use as a coating on paper or other substrate can provide improved image permanence. More specifically, by chemically attaching an ultraviolet blocker and/or a hindered amine light stabilizer to silica, and coating it on a substrate, a homogenous distribution of ultraviolet blocker and/or hindered amine light stabilizer can be realized, thus, protecting dyes present in ink-jet inks from interaction with the silica and external fade producing forces. For example, both ultraviolet blockers and hindered amine light stabilizers, being organic moieties, can interact with the dye molecules via Vander Waals forces in aqueous environments, thereby enhancing wet durability properties of the coating.

Alternatively, by attaching a metal chelating agent to silica and coating the composition onto a substrate, a homogeneous distribution of the chelating agent can be realized, thus protecting metalized dyes from interacting with the silica. Such a combination can result in a reduction of image fade. With respect to the chelating agent, it is also an organic moiety that can interact with a metalized dye molecule through chelation, in addition to Vander Waals forces, thereby enhancing wet durability.

With this in mind, a coated substrate for ink-jet ink printing can comprise a substrate having a porous coating coated thereon. In one embodiment, the porous coating can be silica covalently modified by a chelating agent through a reactive group (and optionally, a spacer group). The chelating agent can further be substantially homogenously distributed on the silica. In an alternative embodiment, the porous coating can be silica covalently attached to an ultraviolet absorber through a reactive group (and optionally, a spacer group). Again, the ultraviolet absorber can be substantially homogenously distributed on the silica. In yet another embodiment, the porous coating can be silica covalently modified by a hindered amine light stabilizer through a reactive group (and optionally, a spacer group), wherein the hindered amine light stabilizer can be substantially homogenously distributed on the silica. Though each embodiment is described individually, any combination of these coatings can be used. For example, the coating can be a homogenous coating comprising silica covalently attached through a reactive group to at least two members independently selected from the group consisting of a chelating agent, an ultraviolet blocker, and a hindered amine light stabilizer. Still further, all three members, i.e., a chelating agent, an ultraviolet blocker, and a hindered amine light stabilizer, can also be present.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

As used in this specification and the appended claims, the singular forms “a,” “an,” and “the” include plural referents unless the content clearly dictates otherwise. “Light fast” or “color fast” refers to the quality of the printed image. Thus, the printed images printed on the ink-jet ink media of the present invention tend to retain their color density and detail (as well as show significantly less fading) when exposed to light, e.g., ultraviolet light, as compared to a standard printed image.

“Humid fast” refers to the ability of a printed image to retain is image quality in damp conditions.

“Water fast” refers to resistance movement of a colorant of an image when in contact with water.

“Wet fast” refers generally to both humid fastness and water fastness. “Ultraviolet absorber” or “ultraviolet blocker” refers to an organic substance that functions as an active ligand to absorb radiant energy in the ultraviolet wavelength range.

“Metal chelator” or “chelating agent” refers to an organic substance that functions as an active ligand to interact with metals found in metalized dyes.

“Hindered amine light stabilizer” or “HALS” includes 2,2,6,6-tetramethylpiperidines and their stable free nitroxyl radicals that act as active ligands in accordance with the present invention. In some embodiments, the 3-,4-, and 5-position can be substituted with oxo, hydroxyl, or sulfonato groups, though other derivatives are possible and functional.

“Active ligands” include ultraviolet blockers, chelating agents, and hindered amine light stabilizers.

The term “lower” when referring to organic compounds or groups (when not otherwise specified) can contain from 1 to 3 carbons. For example, lower alkoxy can include methoxy, ethoxy, or propoxy groups. Additionally, lower alkyl can include methyl, ethyl, or propyl groups.

“Homogenously distributed” or “evenly distributed” refers to a substantially uniform distribution of ultraviolet blockers, chelating agents, and/or hindered amine light stabilizers via chemical attachment to a silica surface.

“Reactive group” is any group that can be used to attach an active ligand, i.e., ultraviolet blocker, a chelating agent, and/or a hindered amine light stabilizer, to silica. The reactive group can be attached directly to the active ligand at any functional location, or can be attached to the active ligand through a spacer group. In one embodiment, the reactive group can be halo silane or lower alkoxy silane, as these reactive groups are functional for attachment to silica.

“Spacer group” can be any organic chain that can be used as a spacer to interconnect or link an active ligand, i.e., ultraviolet blocker, a chelating agent, and/or a hindered amine light stabilizer, to a reactive group. For example, a straight chain alkyl moiety having from 1 to 10 carbons can be used. Numerous other spacer groups can be used as well, such as $—(CH_2)_nNHCO—$ where n is from 1 to 10 carbons, as exemplified herein. The former are exemplary only, as any functional spacer group can be used, provided it is functional in accordance with embodiments of the present invention.

One advantage the present invention is the ability to provide an active ligand as part of a silica media coating wherein the active ligand is at or near the surface of the silica. By the use of such compositions, the active ligand is placed in close proximity to a dye being used to print an image. Additionally, because the active ligand is at or near the surface of the silica, a smaller amount of active ligand is necessary for use to provide a desired result.

In a first embodiment of the present invention, a coated substrate for ink-jet ink printing can comprise a substrate having coated thereon a porous coating, wherein the porous coating can comprise silica covalently attached to a chelating agent via reaction with a reactive group, and wherein the chelating agent can be substantially homogenously distributed on the silica. Though any functional substrate can be used, the most commonly used substrates include paper and photographic media, though other materials can be used as the substrate, e.g., fabrics, metals, plastics, and the like. With respect to the reactive group, any reactive group can be used that is functional for attaching the chelating group to silica, including halo silanes and alkoxy silanes.

As mentioned, a chelating agent can be used to chemically modify silica, forming a chemically modified silica porous coating. The chelating agent in particular can be selected for its reactive properties when in the presence of predetermined metalized dyes. Thus, when a metalized dye is printed on the coating, the metal chelator can immobilize the dye on the coating surface via interaction with the metal, thus, enhancing the wet fastness of the image. A chelating agent class that can be used includes quinolines and isoquinolines. In a more detailed aspect, the chelating agent can be 8-hydroxy quinoline. The following structure is given by way of example, illustrating a possible chelating agent, various reactive groups, and a spacer group that can be used in connection with the present invention.

Formula 1

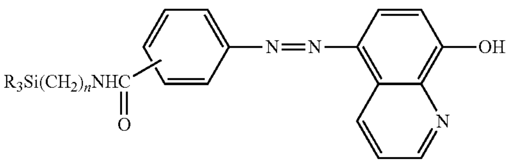

In the above example, each R can independently be halo, lower alkoxy, or a lower alkyl group (such as methyl, ethyl, propyl, or iso-propyl), with the proviso that at least one R must be reactive with silica, e.g., halo or lower alkoxy, and n is from 1 to 10. Thus, a halo silane reactive group and/or a lower alkyl reactive group can be present, as represented by $R_3Si$—. A spacer group is also shown having the formula —$(CH_2)_n$NHCO—, wherein n can be from 1 to 10. Though the reactive group/lower alkyl group and spacer group is shown attached to a certain portion of the metal chelating agent, this is not intended to be limiting. All that is required is that the reactive group maintain its functionality for attaching to silica, and that the chelating agent maintain it functionality for interacting with metals present in dyes. In other words, any means or point of attachment (though a spacer group or without a spacer group) between the chelating agent and the reactive group can be implemented, provided the aforementioned functionalities can be maintained. Further, though a specific spacer group is shown, other spacer groups can be used, as would be known by one skilled in the art after reading the present disclosure.

The reason that there must be at least one reactive group is so that the chelating agent can be covalently attached to the silica (not shown) to form the coating material. Though a chelating agent having reactive groups attached through a silane is shown, other chelating agents having other reactive groups can also be attached to silica and coated on to an ink-jet ink media substrate. For example, a classic metal chelator known in the chemical arts is ethylenediaminetetraacetic acid (EDTA), can be attached to the silica to form a coating material in accordance with the present invention. Other metal chelators can also be used such as diethylenetriaminepentaacetic acid (DTPA), trans-1,2-diaminocyclohexanetetraacetic acid (CDTA), (ethylenedioxy) diethylenedinitrilotetraacetic acid (EGTA), imidazole derivatives, or other chelators that can interact with transition metals.

There are several advantages to providing a coating having a chelating agent covalently attached to silica. In the prior art, cationic modifiers have been incorporated in media coatings such that the coatings interact with anionic dyes of the image. However, as these modifiers are merely admixed within the coating, a non-homogenous distribution of the additive on the porous coating is generally realized. With respect to the present invention, if a metalized dye is used, the chelating agent covalently bonded to the silica can be homogenously distributed, providing a coating that is humid fast. Additionally, the chelating agent modified silica can shield the dye from any catalytic fade actions due to interaction with the silica, thus, improving image permanence. Still further, with the present invention, the use of image fade additives in ink-jet inks, which tends to increase the complexity and reduce the reliability of the ink, can be avoided.

A coated substrate for ink-jet ink printing is also disclosed and can comprise a substrate having a porous coating coated thereon, wherein the porous coating can comprise silica covalently attached to an ultraviolet blocker through a reactive group, and wherein the ultraviolet blocker can be substantially homogenously distributed on the silica. In this embodiment, the substrate can be paper, a photographic substrate, or some other material, e.g., fabrics, metals, plastics, and the like. Whatever ultraviolet blocker is selected for use, it preferably is selected to provide the dual function of shielding the dye molecule from interacting with the silica, as well as provide an ultraviolet blocking function. The ultraviolet blocker can be directly attached to the reactive group, or preferably, the ultraviolet blocker can be tethered to the reactive group through a spacer group.

An example of an ultraviolet blocker that can be attached to silica and used with the present invention is a hydroxydiphenylketone having a reactive group, e.g., $R_3Si$—, attached thereto through a spacer group, e.g., —$CH_2CH_2O$—. In this embodiment, such a structure that can be attached to silica is as follows:

Formula 2

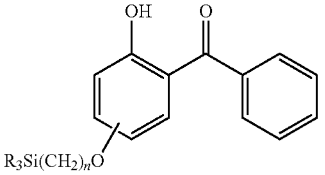

wherein R can be halo, lower alkoxy, or a lower alkyl group (such as methyl or ethyl), with the proviso that at least one R must be reactive with silica, e.g., halo or lower alkoxy, and n is from 1 to 10. Again, any functional reactive group, lower alkyl group, spacer group, or the attachment point to the ultraviolet blocker that is functional, can be implemented for use. For example, a different spacer group/reactive group combination can be attached to either phenyl group of Formula 2.

In the above example, the ultraviolet blocker, the reactive group, and the spacer group are shown. In this configuration, the reactive groups can be attached to silica (not shown), and the entire composition can be coated on a substrate in accordance with the principles of the present invention. Other ultraviolet blockers that can be used include molecules such as dihydroxy-4-methoxybenzophenone, 2-hydroxy-4-n-octoxybenzophenone, hydroxyarylbenzotriazoles, and the like.

With respect to the present embodiment where ultraviolet blockers are chemically attached to silica forming a uniform coating material, there are several advantages of these compositions over the prior art. For example, one prior art solution for improving image permanence has been to include one or more ultraviolet blocker in the ink-jet ink composition itself. A disadvantage of this approach is that it complicates the ink, making it less reliable. Another disadvantage results from dye molecules and ultraviolet blockers migrating differentially when printed on a print medium. Thus, the ultraviolet blocker and the dye molecules are not in the immediate vicinity of each other, reducing the effectiveness of the ultraviolet blocker. Another prior art attempt has been to simply mix an ultraviolet blocker with a silica media coating. However, because the ultraviolet blocker is not chemically attached, the ultraviolet blocker does not remain homogenously distributed. As a result, the ultraviolet blocker may not remain in close proximity to dye molecules of the image. Therefore, efficacy of the additive is reduced.

Conversely, with the compositions of the present invention, the ultraviolet blocker chemically attached to the silica can block ultraviolet light that would otherwise be interacting with the dye molecules of the image. Thus, image permanence can be increased. Further, as the ultraviolet blocker is chemically attached to the silica (through a lower alkoxy silane, or a halo silane, for example), the ultraviolet blocker can also shield the dye molecules from interacting with the silica, mitigating reactions leading to dye fade.

Additionally, a coated substrate for ink-jet ink printing can comprise a substrate having a porous coating coated thereon, wherein the porous coating can comprise silica covalently attached to a hindered amine light stabilizer through a reactive group, and wherein the hindered amine light stabilizer can be substantially homogenously distributed on the silica. Again, the substrate can be any functional substrate including paper, photographic substrates, metal, plastic, fabric, and the like. Further, the reactive group can be any functional reactive group for attaching the hindered amine light stabilizers to silica. For example, halo silane reactive groups and alkoxy silane reactive groups can be used (with or without the presence of a spacer group) to attach the hindered amine light stabilizers to a silica material for coating a substrate.

Any of a number of hindered amine light stabilizers can be used, such as those defined by the following structures:

Formula 3

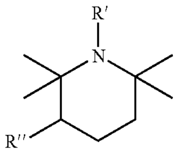

Formula 4

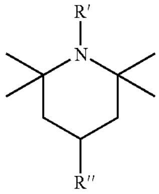

Formula 5

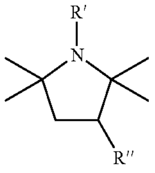

Formula 6

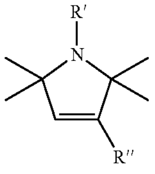

In Formulas 3-6 above, R' can be H, OH, O.; and R" can be any organic group that is functional, i.e., does not detract from the hindered amine portion of the molecule, including H, O, OH, $SO_3CH_3$, or $CO_2(C_6H_5)$, for example, with the proviso that when R" is O, it is bound to the heterocyclic ring by a double bond. Exemplary of Formula 3 and 4 above are the following hindered amine light stabilizers:

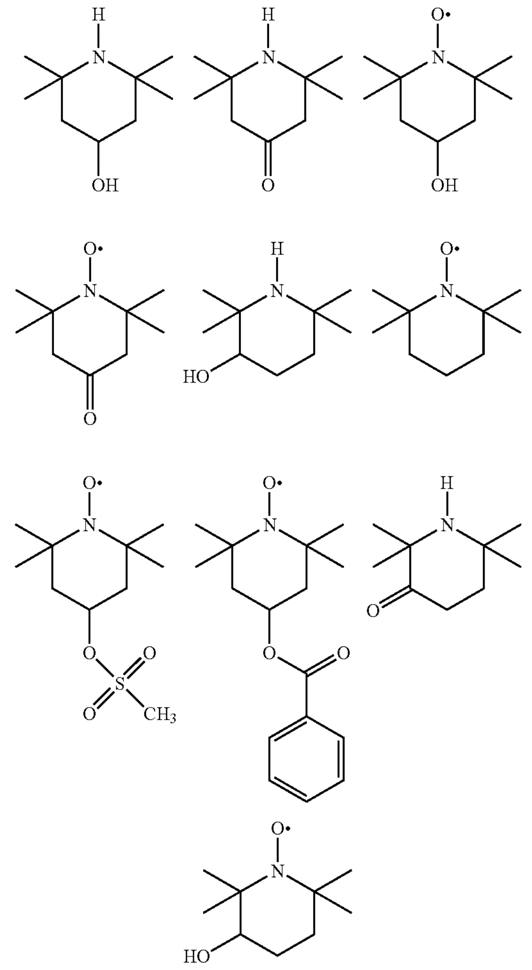

Exemplary of Formula 5-6 above are the following hindered amine light stabilizers:

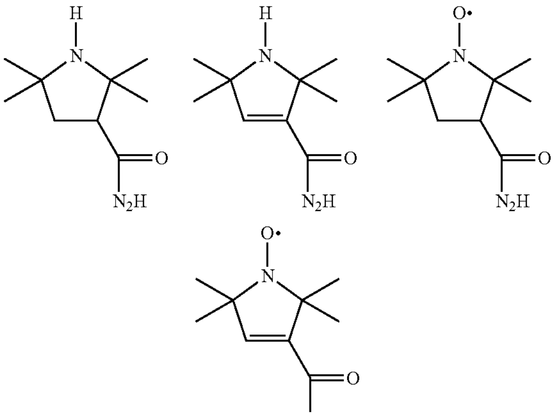

Because various active ligands are provided for the present embodiment, an example of a hindered amine light stabilizer attached to a reactive group through a spacer group is provided below, though any other of the active ligands could have been selected for the present example:

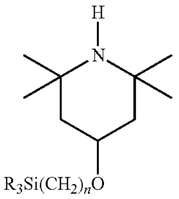

In the above example, n can be from 1 to 10 carbons, and the reactive group ($R_3Si$—) is shown attached to the hindered amine light stabilizer through its 4-position oxygen via a carbon spacer group. Though a specific spacer group is shown, this is by way of example only, as other spacer groups can be used that are functional. The reactive group can also be attached to the active ligand through a spacer group at the 3- or 5-position carbon or at any of the four methyl groups attached at the 2- or 6-position of the heterocyclic ring. Further, if the active ligand is a five-membered ring, the reactive group can also be attached to the active ligand through a spacer group at the 3- or 4-position carbon or at any of the four methyl groups attached at the 2- or 5-position of the heterocyclic ring. Any of these sites can be functional for attachment. However, the amine group is not an appropriate location for attachment as it is the amine (hindered by the 2,2,6,6 methyl groups of the six-membered ring or the 2,2,5,5 methyl groups of the five-membered ring) that provides ligand functionality. Likewise any of the hindered amine light stabilizer ligands that are disclosed herein, or that are within the scope of the present invention, can be attached to reactive groups using the parameters set forth in accordance with the above example.

In yet another embodiment, a coated substrate for ink-jet ink printing can comprise a substrate having homogenously coated thereon, a coating comprising silica covalently attached through a reactive group to at least two members independently selected from the group consisting of a chelating agent, an ultraviolet blocker, and a hindered amine light stabilizer. In a more detailed aspect of this embodiment, the substrate can be a photographic substrate, and the coating can include silica covalently attached through a reactive group to the chelating agent, the ultraviolet blocker, and the hindered amine light stabilizer.

Silica can be modified with an ultraviolet blocker, a chelating agent, and/or a hindered amine light stabilizer according to the following general method. First, the silica is dried in a vacuum at an elevated temperature to remove adsorbed moisture and allowed to cool down to room temperature. The solvent in which the reaction is carried out is also dried with an appropriate drying agent. Common solvents that can be used included toluene, dichloromethane, isopropanol, and/or methanol. Next, the silica is taken in the dry solvent (or it may be dispersed in the solvent by sonication). The amount of solvent used should be selected such that the reagent concentration (when added) does not generally exceed about 10%. The vessel containing the mixture may then be flushed with dry nitrogen, and then the reagent, e.g., lower alkoxy or halo silane functionalized with an ultraviolet blocker, a chelating agent, or a hindered amine light stabilizer, is introduced into the reaction vessel. The amount of reagent added depends on the surface area, and the surface silanol concentration of the silica and the molecular weight of the reagent. When selecting the reaction conditions, one should consider its reactivity. For example, alkoxy silanes are less reactive than halo silanes. Thus, reaction times and temperatures are adjusted after considering the reagent used. Typically, about six hours or more of refluxing under dry nitrogen is required. If carried out at room temperature rather than at elevated temperatures, longer reactions times may be necessary. After the reaction is completed, the product is filtered and washed with excess solvent and dried. This general procedure can be carried out to prepare the coating material for use with the present invention. This reaction may also be carried out without the use of excess reagent, thus eliminating the need to remove excess reagent by washing. Methanol is a preferred solvent, hence, small amounts of it may remain in the product since it is miscible with water, which is used in the subsequent coating step.

The application of the coating composition can be conducted by using any of a number of methods known in the art, including the use of an air knife coater, a blade coater, a gate roll coater, a doctor blade, a Meyer rod, a roller, a reverse roller, a gravure coater, a brush applicator, a sprayer, and the like. Further, drying of the coating may be effected by conventional means such as hot air convection, microwave, infrared heating, or open air drying.

Though several examples of active ligands, spacer groups, and reactive groups have been given, these examples are not meant to be limiting. For example, any active ligand that can be covalently attached to silica can be used, by any reactive group, or through any spacer group that is functional.

EXAMPLES

The following examples illustrate various aspects of the coatings for porous ink-jet ink media substrates of the present invention. The following examples should not be considered as limitations of the invention, but should merely teach how to make the best coatings, reflecting the present invention.

Example 1

Attachment of Active Ligand to Reactive Group Through Spacer Group

As illustrated by steps A, B and C below, the following reaction is carried out to attach an active ligand to a reactive group through a spacer group (forming a silane reagent). The present example illustrates the modification of a hindered amine light stabilizer, though other active ligands can also be modified likewise, or by other methods known in the art.

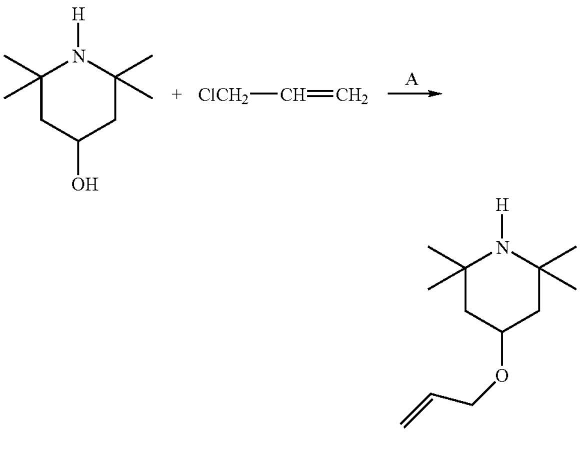

-continued

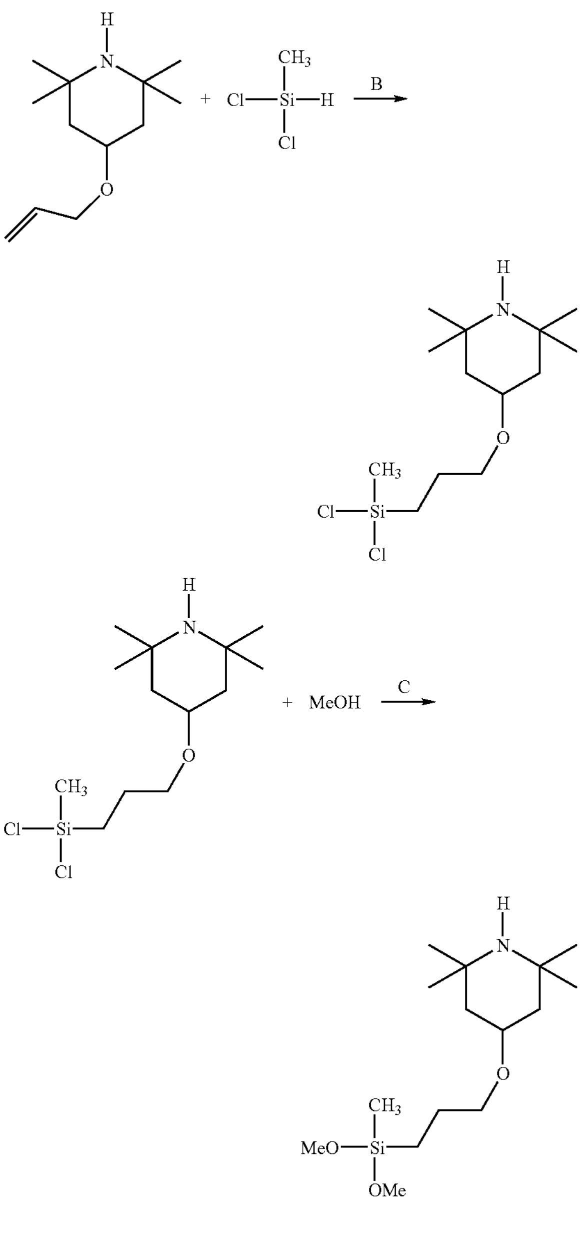

Example 2

Preparation of Ultraviolet Blocker-Modified Silica

About 40 grams of silica to be modified is dried overnight in a vacuum at about 110° C. to remove adsorbed moisture. The dried silica is then allowed to cool to room temperature. Next, about 500 ml of methanol is dried over calcium sulfate. The dried silica is then taken in the dried methanol and the silica is dispersed in methanol by sonication. Dry nitrogen is passed in to the reaction vessel at a slow rate to eliminate ambient moisture. The reagent, as shown below (which includes the active ligand, the spacer group, and the reactive group), is injected in to the reaction vessel, and the reaction mixture is stirred at ambient temperature, or refluxed.

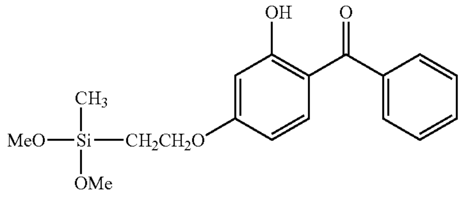

The amount of reagent used in the reaction is dependent on the surface area, and the surface silanol concentration of the silica and the functionality of the reagent. The amount of reagent (in grams) needed for complete reaction for the bifunctional silane shown above is given by 40 g×S $m^2$/g×M g/mol×8 micro mol/$m^2$×$10^{-6}$/2, where, S=surface area, M=Molecular weight of the reagent, and the surface silanol concentration is 8 micro mol/$m^2$. The product is filtered or centrifuged, and if excess reagent is used, it is removed by washing with dry methanol and dried.

Example 3

Preparation of Chelating Agent-Modified Silica

The same procedure followed in Example 2 is followed in the present Example, except the reagent (which includes the active ligand, the spacer group, and the reactive group), is as follows:

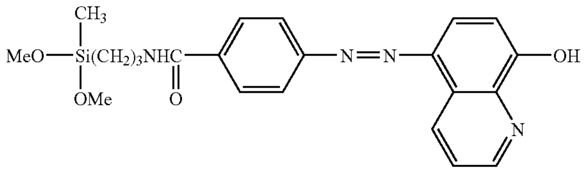

Example 4

Preparation of Hindered Amine Light Stabilizer-Modified Silica

The same procedure followed in Example 2 is followed in the present Example, except the reagent (which includes the active ligand, the spacer group, and the reactive group and can be present as described in Example 1), is as follows:

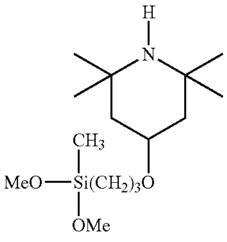

Example 5

Coatings prepared according to Examples 2-4 can each individually be prepared and coated on to paper or photographic substrates by a hand draw down method, or another functional method. Compositions prepared according to Examples 2-4 can also be admixed at a 1:1:1 weight ratio and coated together on to a single paper substrate using a hand draw down method, or other functional method. Further, any two of the compositions prepared according to Examples 2-4 can also be admixed at a 1:1 weight ratio and coated together on to a single paper substrate using a hand draw down method, or other functional method. Coated papers prepared according to the present example exhibit improved image fastness performance compared to papers having only silica coated thereon.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A coated substrate for ink-jet ink printing, comprising:

(a) a paper or photographic media substrate, having coated thereon, (b) a porous coating, said porous coating comprising silica covalently attached to a chelating agent through a reactive group, prior to printing ink on the paper or photographic media substrate.

2. A coated substrate as in claim 1 wherein the reactive group is selected from the group consisting of a halo silane and an alkoxy silane.

3. A coated substrate as in claim 1 wherein the chelating agent comprises 8-hydroxy quinoline.

4. A coated substrate as in claim 1 wherein the chelating agent is attached to the reactive group through a spacer group.

5. A coated substrate as in claim 4 wherein the chelating agent attached to the reactive group through the spacer group as a whole has the structure:

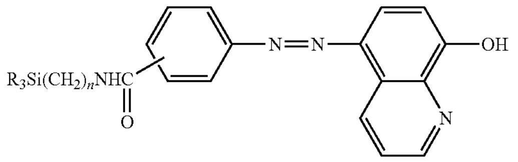

wherein each R is independently halide, lower alkoxy, or a lower alkyl group, with the proviso that at least one R must be halide or lower alkoxy, and wherein n is from 1 to 10.

6. A coated substrate as in claim 1 wherein the chelating agent is selected from the group consisting of is ethylenediaminetetraacetic acid (EDTA), diethylenetriaminepentaacetic acid (DTPA), trans-1,2-diaminocyclohexanetetraacetic acid (CDTA), (ethylenedioxy) diethylenedinitrilotetraacetic acid (EGTA), imidazole derivatives, and combinations thereof.

7. A coated substrate claim 1, comprising:

the paper or photographic media substrate, having homogenously coated thereon, the porous coating comprising the silica covalently attached through reactive groups to the chelating agent and at least one members independently selected from the group consisting of an ultraviolet blocker and a hindered amine light stabilizer, wherein the print media substrate and the coating are configured for ink-jet ink printing.

8. A coated substrate as in claim 7, wherein the coating includes the silica covalently attached through reactive groups to the chelating agent, the ultraviolet blocker, and the hindered amine light stabilizer.

9. A coated substrate as in claim 7, wherein at least two members are attached to the reactive groups through spacer groups.

10. A coated substrate for ink jet printing, comprising:

(a) a paper or photographic media substrate, having coated thereon, (b) a porous coating, said porous coating comprising silica covalently attached to a chelating agent through a reactive group, wherein the chelating agent comprises 8-hydroxy quinoline.

11. A coated substrate as in claim 10, wherein the reactive group is selected from the group consisting of a halo silane and an alkoxy silane.

12. A coated substrate as in claim 10, wherein the chelating agent is attached to the reactive group through a spacer group.

13. A coated substrate for ink-jet printing, comprising:

(a) a paper or photographic media substrate, having coated thereon, (b) a porous coating, said porous coating comprising silica covalently attached to a chelating agent through a reactive group, wherein the chelating agent is attached to the reactive group through a spacer group.

14. A coated substrate as in claim 13, wherein the reactive group is selected from the group consisting of a halo silane and an alkoxy silane.

15. A coated substrate as in claim 13, wherein the chelating agent comprises 8-hydroxy quinoline.

16. A coated substrate as in claim 13, wherein the chelating agent attached to the reactive group through the spacer group as a whole has the structure:

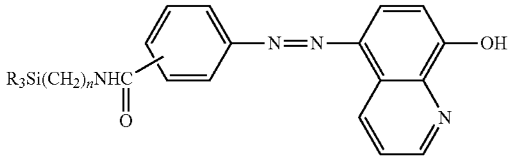

wherein each R is independently halide, lower alkoxy, or a lower alkyl group, with the proviso that at least one R must be halide or lower alkoxy, and wherein n is from 1 to 10.

17. A coated substrate as in claim 13, wherein the chelating agent is selected from the group consisting of is ethylenediaminetetraacetic acid (EDTA), diethylenetriaminepentaacetic acid (DTPA), trans-1,2-diaminocyclohexanetetraacetic acid (CDTA), (ethylenedioxy) diethylenedinitrilotetraacetic acid (EGTA), imidazole derivatives, and combinations thereof.

* * * * *

UNITED STATES PATENT AND TRADEMARK OFFICE

CERTIFICATE OF CORRECTION

PATENT NO. : 7,919,176 B2
APPLICATION NO. : 10/120470
DATED : April 5, 2011
INVENTOR(S) : Palitha Wickramanayake It is certified that error appears in the above-identified patent and that said Letters Patent is hereby corrected as shown below:

In column 13, line 27, in Claim 2, delete “halo” and insert -- halogenated --, therefor.

In column 13, line 56, in Claim 7, delete “substrate claim” and insert -- substrate as in claim --, therefor.

In column 13, line 61, in Claim 7, delete “members” and insert -- member --, therefor.

In column 14, line 12, in Claim 10, delete “ink jet” and insert -- ink-jet --, therefor.

Signed and Sealed this
Eleventh Day of October, 2011

David J. Kappos
*Director of the United States Patent and Trademark Office*